US012697932B2

(12) United States Patent
Verdier et al.

(10) Patent No.: US 12,697,932 B2
(45) Date of Patent: Aug. 4, 2026

(54) ELECTRICAL POWER SUPPLY SYSTEM FOR A VEHICLE

(71) Applicant: SCHAEFFLER TECHNOLOGIES AG & CO. KG, Herzogenaurach (DE)

(72) Inventors: Damien Verdier, Toulouse (FR);
Jérôme Lachaize, Toulouse (FR);
Nicolas Leto, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/118,092

(22) PCT Filed: Nov. 21, 2023

(86) PCT No.: PCT/EP2023/082555
§ 371 (c)(1),
(2) Date: Apr. 3, 2025

(87) PCT Pub. No.: WO2024/115200
PCT Pub. Date: Jun. 6, 2024

(65) Prior Publication Data
US 2026/0125010 A1 May 7, 2026

(30) Foreign Application Priority Data
Nov. 28, 2022 (FR) ................................. FR2212379

(51) Int. Cl.
*B60R 16/033* (2006.01)
*B60L 1/14* (2006.01)
(Continued)

(52) U.S. Cl.
CPC .............. *B60R 16/033* (2013.01); *B60L 1/14* (2013.01); *B60L 53/11* (2019.02); *B60L 53/22* (2019.02);
(Continued)

(58) Field of Classification Search
CPC .......... B60R 16/033; B60L 1/14; B60L 53/11; B60L 53/22; B60L 58/18; B60L 2210/10; B60L 2210/42
See application file for complete search history.

(56) References Cited

U.S. PATENT DOCUMENTS 9,671,435 B2    6/2017  Despesse et al.
9,673,431 B2    6/2017  Despesse
(Continued)

FOREIGN PATENT DOCUMENTS

DE       102013212682 A1     12/2014
DE       102020209673 A1      2/2022
(Continued)

OTHER PUBLICATIONS

International Search Report (PCT/ISA/210) and Written Opinion (PCT/ISA/237) both with English translation mailed on Jan. 24, 2024, by the European Patent Office as the International Searching Authority for International Application No. PCT/EP2023/082555, 22 pages.

*Primary Examiner* — Jessica Han
*Assistant Examiner* — Alex W Lam
(74) *Attorney, Agent, or Firm* — Buchanan Ingersoll & Rooney PC

(57) ABSTRACT

An electric power supply system for an electric or hybrid vehicle. The vehicle includes an electric power supply bus able to supply power to electrical equipment installed in the vehicle. The system including: a DC-DC voltage converter; at least two power supply cells, each including: i) a rectifier, ii) a battery, and iii) a switching cell; and a distribution module intended to be connected to a recharging module external to the vehicle. The power supply system is configured to operate in an operating mode in which: the batteries are connected in series by the first set of switches, and the (Continued)

distribution module connects one or more batteries to the external recharging module.

7 Claims, 4 Drawing Sheets

(51) Int. Cl.
   B60L 53/10          (2019.01)
   B60L 53/22          (2019.01)
   B60L 58/18          (2019.01)
(52) U.S. Cl.
   CPC ........... B60L 58/18 (2019.02); B60L 2210/10 (2013.01); B60L 2210/42 (2013.01)

(56)                References Cited

U.S. PATENT DOCUMENTS

| | | | |
|---|---|---|---|
| 9,948,095 | B2 | 4/2018 | Despesse |
| 9,994,237 | B2 | 6/2018 | Jestin et al. |
| 10,186,861 | B2 | 1/2019 | Rapp et al. |
| 11,362,526 | B2 | 6/2022 | Bacquet et al. |
| 11,362,534 | B2 | 6/2022 | Lopez et al. |
| 11,509,147 | B2 | 11/2022 | Despesse et al. |
| 11,532,941 | B2 | 12/2022 | Thomas et al. |
| 11,581,584 | B2 | 2/2023 | Fernandez et al. |
| 11,799,392 | B2 | 10/2023 | Helling et al. |
| 11,876,389 | B2 | 1/2024 | Thomas et al. |
| 11,876,390 | B2 | 1/2024 | Lopez et al. |
| 11,881,565 | B2 | 1/2024 | Thomas et al. |
| 2014/0230089 | A1 | 8/2014 | Chevalier et al. |
| 2017/0353042 | A1* | 12/2017 | Liu ................... H01M 10/4257 |
| 2018/0301929 | A1* | 10/2018 | Krishnan .............. H01M 8/186 |
| 2019/0359078 | A1* | 11/2019 | Yamada .................. B60L 50/16 |
| 2022/0231537 | A1* | 7/2022 | Hirota .................... H02J 1/082 |

FOREIGN PATENT DOCUMENTS

| | | | |
|---|---|---|---|
| FR | 2972304 | A1 | 9/2012 |
| FR | 2972306 | A1 | 9/2012 |
| FR | 2977896 | A1 | 1/2013 |
| FR | 2986120 | A1 | 7/2013 |
| FR | 2995696 | A1 | 3/2014 |
| FR | 3074976 | A1 | 6/2019 |
| FR | 3074977 | A1 | 6/2019 |
| FR | 3076084 | A1 | 6/2019 |
| FR | 3076108 | A1 | 6/2019 |
| FR | 3076109 | A1 | 6/2019 |
| FR | 3076111 | A1 | 6/2019 |
| FR | 3076112 | A1 | 6/2019 |
| FR | 3076663 | A1 | 7/2019 |
| WO | 2015000713 | A1 | 1/2015 |
| WO | 2018122094 | A1 | 7/2018 |

* cited by examiner

ELECTRICAL POWER SUPPLY SYSTEM FOR A VEHICLE

CROSS REFERENCE TO RELATED APPLICATIONS

This application is the U.S. National Phase Application of PCT International Application No. PCT/EP2023/082555, filed Nov. 21, 2023, which claims priority to French Patent Application No. FR2212379, filed Nov. 28, 2022, the contents of such applications being incorporated by reference herein.

FIELD OF THE INVENTION

The invention relates to the field of hybrid or electric vehicles, and more specifically to an electric power supply system for a hybrid or electric vehicle.

BACKGROUND OF THE INVENTION

In a known manner, an electric or hybrid vehicle comprises an electric machine for propulsion of the vehicle, as well as a storage battery able to be connected to the electric machine. An inverter is connected between the battery and the electric machine and makes it possible to convert the DC voltage provided by the battery into an AC voltage, in particular three-phase AC voltage, in order to supply power to each phase of the electric machine.

The vehicle also comprises an internal electric power supply network, which makes it possible to supply power to the electrical equipment of the vehicle (for example the windscreen wipers, the headlights, the warning lights of the dashboard, etc.).

The voltage provided by the network is, for example, 12 or 14 V.

The vehicle also comprises an auxiliary battery able to supply power to the network and a DC-DC voltage converter connected between the auxiliary battery and the battery in order to recharge the auxiliary battery.

This has the drawback of having to install and configure numerous converters in the vehicle.

In addition, each battery is in reality made up of a set of battery cells statically connected to one another. The charge level of each battery depends on the state of charge of each cell. However, the cells might not all have identical electrical and energy characteristics. The dimensioning of each battery must therefore take into consideration aging phenomena and the performance of each cell, which is restrictive.

Moreover, the components of the converter and of the inverter are dimensioned such that the voltage provided by the converter and the inverter are each defined over a wide range of voltages. Therefore, since each of these elements is not dimensioned for an optimal operating voltage, this may cause losses after each conversion implemented by the converter or the inverter, on the one hand, and difficulty in accurately controlling the output voltage of each converter and/or inverter, on the other hand.

There is therefore the need for a solution which makes it possible to overcome, at least in part, the drawbacks described above.

SUMMARY OF THE INVENTION

To this end, an aspect of the invention relates to an electric power supply system for an electric or hybrid vehicle, the vehicle comprising an electric power supply bus able to supply power to electrical equipment installed in the vehicle, said system comprising:
- a) a DC-DC voltage converter,
- b) at least two power supply cells, each comprising:
  - i) a rectifier able to provide an AC voltage from a DC voltage and vice versa,
  - ii) a battery, which is electrically connected to the rectifier, able to operate in a discharge mode in which the battery is able to provide a first DC voltage and able to operate in a charge mode in which the battery is able to recharge from a DC voltage,
  - iii) a switching cell comprising switches able to connect the battery to the converter,
- c) a first set of switches able to connect the battery of a power supply cell to the battery of the neighboring power supply cell in order to connect the set of batteries in series,
- d) a control unit configured to control the first set of switches, the second set of switches and each switch of each switching cell,
- e) a distribution module intended to be connected to a recharging module (60) external to the vehicle, said recharging module being configured to provide a supply power, the distribution module being configured to electrically connect at least one battery to the external recharging module in order to recharge the at least one battery from the power provided by the recharging module, the power supply system is configured to operate in an operating mode in which:
  the batteries are connected in series by the first set of switches,
  the distribution module connects one or more batteries to the external recharging module.

The recharging module supports a fixed supply voltage. This supply voltage may depend on the external equipment connected to the recharging module and/or may be inherent to said charging module. Therefore, when the supply voltage supported by the recharging module and available to the power supply system is sufficient to simultaneously recharge the set of batteries connected in series, then the distribution module connects all the batteries to the recharging module. By contrast, if this supply voltage supported by the recharging module makes it possible to recharge only some of the batteries, then the distribution module connects the recharging module to some of the batteries. This makes it possible to adapt the number of batteries to be simultaneously connected to the recharging module depending on the supply voltage supported by the external recharging module and available to recharge the batteries of the electric system.

Preferably, the distribution module is configured to:
- a) in a first operating mode: connect the set of batteries connected in series to the external recharging module,
- b) in a second operating mode: connect half of the set of batteries to the external recharging module.

Therefore, for example, for a set of batteries that are connected in series and able to be recharged from a voltage substantially equal to 800 V, if a recharging module supports a voltage of 800 V but a plurality of items of external equipment are connected to the recharging module and only 400 V of this voltage is available to recharge the batteries of the electric system, the distribution module connects only half of the batteries to the external recharging module.

Therefore, again for example, if the set of batteries connected in series is able to be recharged from a voltage substantially equal to 800 V but the charging module only supports a voltage of 400 V, then the power supply system as presented makes it possible to connect only some of the batteries to the recharging module, so that the recharging module does not undergo a voltage overload.

Therefore, it is possible to adapt the power and voltage level to be connected to the recharging module by selecting the set of batteries, or some of the batteries, connected in series in order to prevent the recharging module from undergoing a voltage and power overload. This also allows batteries to be recharged, even if they are not all recharged simultaneously.

By contrast, if few or no items of equipment are connected to the charging module and the charging module is able to support a voltage sufficient to simultaneously recharge the set of connected batteries, then the distribution module connects all the batteries to the external recharging module.

More preferably, the distribution module comprises:
a) a first switch able to connect a first terminal of the external recharging module to the first battery of the set of batteries connected in series or to a battery located between the first battery and the last battery of the set of batteries connected in series,
b) a second switch able to connect a second terminal of the external recharging module to a battery located between the first battery and the last battery of the set of batteries connected in series or to the last battery.

Therefore, this embodiment is simple to implement in the electric system.

More preferably, each power supply cell comprises a coil connected to the rectifier, on the one hand, and intended to be connected to an AC voltage, on the other hand.

Advantageously, the power supply system comprises three power supply cells.

An aspect of the invention also relates to a motor vehicle comprising an electric power supply bus able to supply power to electrical equipment installed in the vehicle, and an electric power supply system as presented above.

Finally, an aspect of the invention relates to a method for controlling a system as presented above, said method being implemented by the control unit and comprising the steps of:
a) connecting the set of batteries in series,
b) connecting the set of batteries, or some of the batteries, connected in series to the external recharging module.

BRIEF DESCRIPTION OF THE DRAWINGS

Other features and advantages of aspects of the invention will become more clearly apparent on reading the following description. This description is purely illustrative and should be read with reference to the appended drawings, in which.

DETAILED DESCRIPTION OF EXEMPLARY EMBODIMENTS

Vehicle

Figure 1:
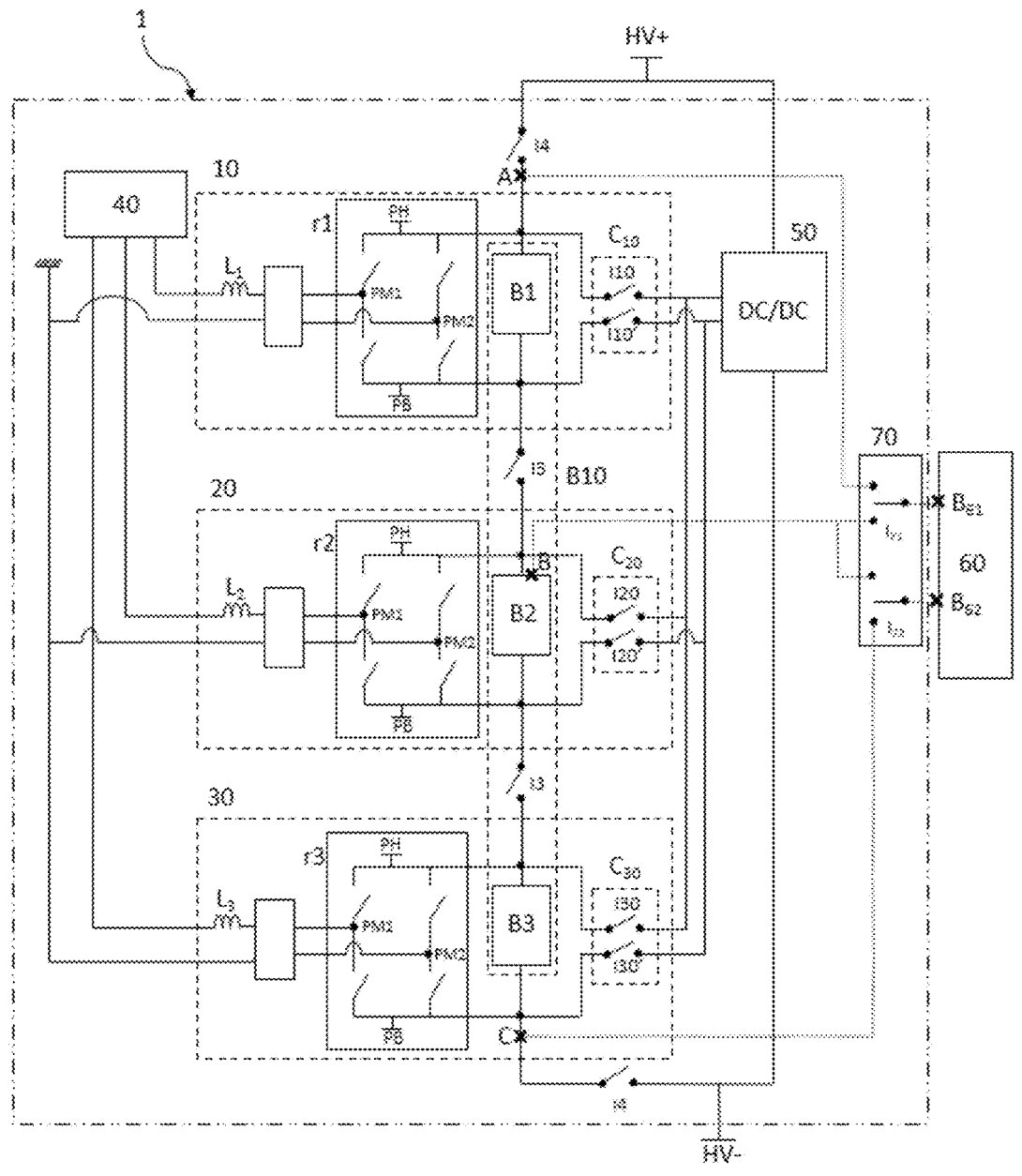
FIG. 1 is a circuit diagram showing the power supply system according to an aspect of the invention.

With reference to FIG. 1, a vehicle according to an aspect of the invention will now be described. In particular, the vehicle comprises an electric power supply bus HV. The electric power supply bus HV is able to provide electrical energy to various items of electrical equipment installed in the vehicle. Even more specifically, the power supply bus comprises a positive terminal HV+ and a negative terminal HV−.

The vehicle also comprises an electric power supply system 1.

Power Supply System

With reference to FIG. 1, the power supply system 1 comprises at least two power supply cells 10, 20, 30, a connection module 40, a DC-DC voltage converter 50, a control unit (not shown in the figures) and a distribution module 70.

Preferably, the power supply system 1 comprises a first power supply cell 10, a second power supply cell 20 and a third power supply cell 30. Each power supply cell 10, 20, 30 is able to convert an AC voltage into a DC voltage.

Power Supply Cell 10, 20, 30

Each power supply cell 10, 20, 30 comprises a rectifier r1, r2, r3, a battery B1, B2, B3 and a switching cell $C_{10}$, $C_{20}$, $C_{30}$.

More specifically, the rectifier r1, r2, r3 of each power supply cell 10, 20, 30 is said to be bidirectional. In other words, each rectifier r1, r2, r3 is able to provide an AC voltage from a DC voltage and vice versa.

Each rectifier r1, r2, r3 comprises two input terminals and two output terminals.

More specifically, in the present case, each rectifier r1, r2, r3 comprises a first switch connected between a high point PH and a first midpoint PM1, a second switch connected between the first midpoint PM1 and a low point PB, a third switch connected between the high point PH and a second midpoint PM2 and a fourth switch connected between the second midpoint PM2 and the low point PB. The two input terminals of each rectifier r1, r2, r3 designate the first midpoint PM1 and the second midpoint PM2. The two output terminals designate the high point PH and the low point PB.

The battery B1, B2, B3 of each power supply cell 10, 20, 30 is able to operate in a discharge mode in which the battery B1, B2, B3 is able to provide a first DC voltage. Moreover, the battery B1, B2, B3 of each power supply cell 10, 20, 30 is also able to operate in a charge mode in which the battery B1, B2, B3 provides electrical energy.

Each battery B1, B2, B3 comprises a set of storage cells.

In addition, the battery B1, B2, B3 of each power supply cell 10, 20, 30 is connected to the corresponding rectifier r1, r2, r3. More specifically, each battery B1, B2, B3 is connected between the two output terminals of the corresponding rectifier r1, r2, r3.

The switching cell $C_{10}$, $C_{20}$, $C_{30}$ of each power supply cell 10, 20, 30 is able to connect the battery B1, B2, B3 to the DC-DC converter 50. In other words, the switching cell $C_{10}$, $C_{20}$, $C_{30}$ is connected to the battery B1, B2, B3, on the one hand, and to the DC-DC converter 50, on the other hand.

Each switching cell $C_{10}$, $C_{20}$, $C_{30}$ comprises a first switch I10, I20, I30 and a second switch I10', I20', I30'.

The first switch I10, I20, I30 of each power supply cell 10, 20, 30 makes it possible to connect a first terminal of the battery B1, B2, B3 to a terminal of the DC-DC converter 50.

The second switch I10', I20', I30' of each power supply cell 10, 20, 30 makes it possible to connect a second terminal of the battery B1, B2, B3 to a second terminal of the DC-DC converter 50.

Coils

In addition, each power supply cell 10, 20, 30 comprises a coil L1, L2, L3 connected to the input of the rectifier r1, r2, r3; in other words, a coil is connected to the rectifier r1, r2, r3, on the one hand, and intended to be connected to an AC voltage, on the other hand.

The power supply system 1 also comprises a first set of switches I3 and a second set of switches I4.

Connection Module 40

The connection module 40 makes it possible to connect a single-phase voltage or a three-phase voltage to each power supply cell 10, 20, 30.

First Set of Switches I3

The first set of switches I3 is able to connect the battery B1, B2, B3 of a power supply cell 10, 20, 30 to the battery B1, B2, B3 of the neighboring power supply cell 10, 20, 30 in order to connect the batteries B1, B2, B3 in series.

For this purpose, the first set of switches I3 comprises:
  a. a switch connected to the battery B1 of the first power supply cell $C_{10}$, on the one hand, and to the battery B2 of the second power supply cell $C_{20}$, on the other hand,
  b. a switch connected to the battery B2 of the second power supply cell $C_{20}$, on the one hand, and to the battery B3 of the third power supply cell $C_{30}$, on the other hand.

Therefore, the batteries B1, B2, B3 may be connected in series; it is then said that the batteries form a power supply branch.

Second Set of Switches I4

The second set of switches I4 makes it possible to connect the battery B1 of the first power supply cell $C_{10}$ to the power supply bus HV, in particular in order to connect the branch of series-connected batteries B1, B2, B3 between the positive terminal HV+ and the negative terminal HV− of the power supply bus HV.

Moreover, each power supply cell 10, 20, 30 may also comprise an EMC (electromagnetic compatibility) filter connected between each rectifier r1, r2, r3 and the connection module 40.

The control unit (not shown in the figures) is configured to control the connection module 40, the first set of switches I3, the second set of switches I4, and the opening and the closing of each switch I10, I10', I20, I20', I30, I30' of each switching cell $C_{10}$, $C_{20}$, $C_{30}$ and of each rectifier r1, r2, r3. The control unit is also able to control the voltage provided and generated by each battery B1, B2, B3 in order, for example, to regulate the current in the inductors L1, L2, L3 or to regulate the voltage to be provided to the DC-DC converter 50.

External Recharging Module 60

In order to recharge the batteries, it is possible to use a recharging module 60 that is external to the vehicle, commonly referred to as a "DC fast charging terminal" by a person skilled in the art, and identified in the figures by the reference sign 60.

The external recharging module 60 is therefore configured to provide a supply voltage and comprises two connection terminals, for example a first terminal $B_{61}$ and a second terminal $B_{62}$.

Distribution Module 70

The distribution module 70 is intended to be connected to the external recharging module 60.

The distribution module 70 is configured to electrically connect at least one battery B1, B2, B3 to the external recharging module 60 in order to recharge the at least one battery B1, B2, B3 from the power provided by the recharging module 60. For this purpose, the set of batteries B1, B2, B3 have to be connected in series by the first set of switches I3. In the example presented in FIGS. 1 to 4, a system comprising three batteries B1, B2, B3 is shown, and the battery B1 designates the first battery, and the battery B3 designates the "last battery".

More specifically, the distribution module 70 comprises a first switch $I_{71}$ and a second switch $I_{72}$.

The first switch $I_{71}$ is able to connect the first terminal $B_{61}$ of the recharging module 60 to:
  a. the first battery B1 of the set of batteries connected in series via a first point "A", for example located between the first battery B1 and the positive terminal HV+ of the power supply bus,
  b. or to a battery that is said to be "intermediate" because it is connected between the first battery B1 and the last battery B3 of the set of batteries connected in series via a second point "B".

In particular, when the number of batteries is even, the second point B is located between the two batteries placed in the middle, and when the number of batteries is odd, the second point B is located on one of the storage cells of the battery placed in the middle. Therefore, in the present case, the second point B is, for example, located between the first battery B1 and the second battery B2 or directly located on one of the storage cells of the second battery B2.

In other words, in the example presented, the first switch $I_{71}$ connects the first battery B1 or the second battery B2 to the first terminal $B_{61}$.

The second switch $I_{72}$ is able to connect the second terminal $B_{62}$ of the recharging module 60 to:
  a. an intermediate battery via the second point B,
  b. or to the last battery B3 via a third point "C" located between the last battery and the negative terminal HV− of the power supply bus.

In other words, in the example presented, the second switch $I_{72}$ connects the second battery B2 or the third battery B3 to the second terminal $B_{62}$.

The distribution module 70 is able to operate in a plurality of operating modes.

Figure 2:
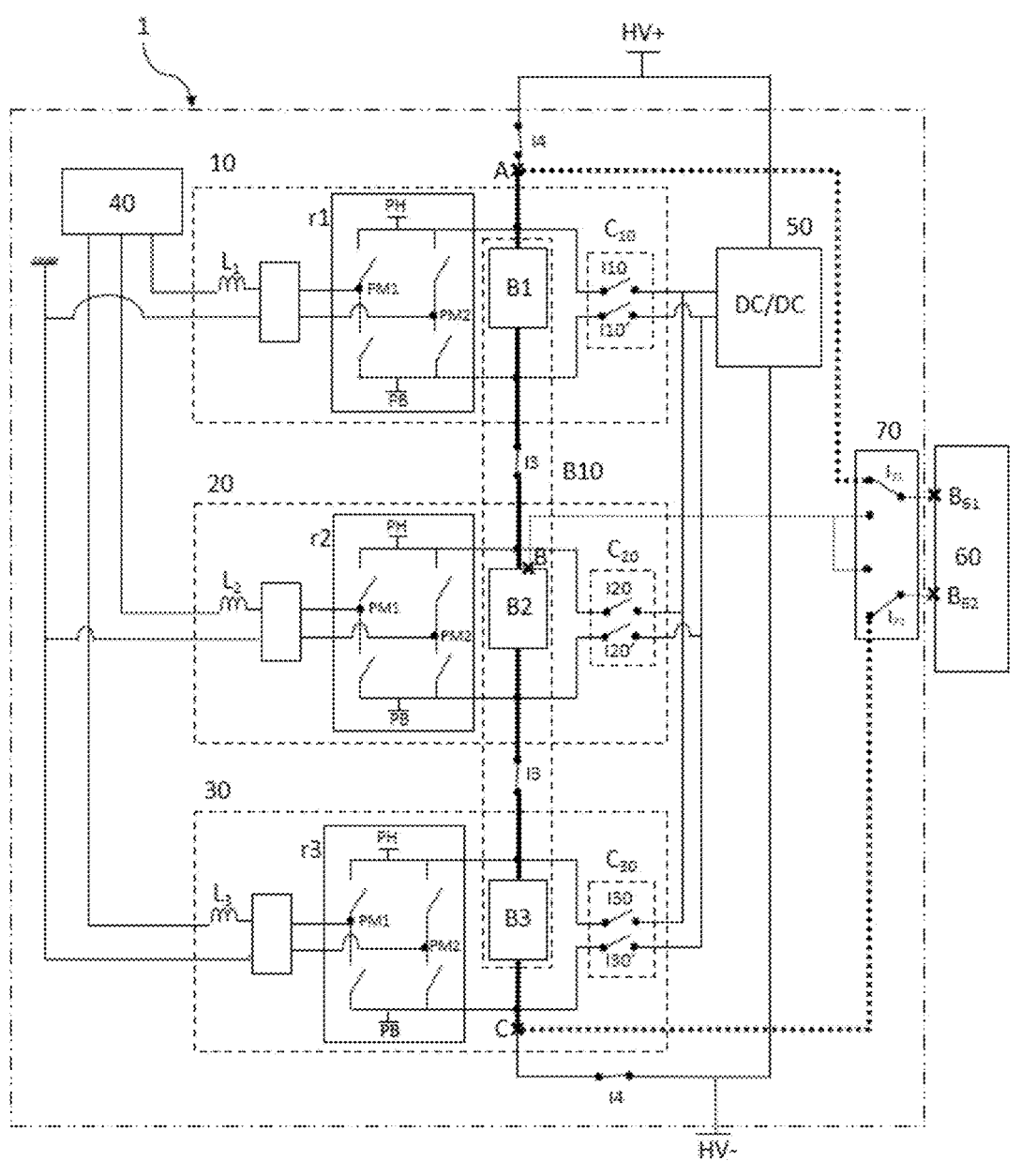
FIG. 2 is a circuit diagram showing a first operating mode of the power supply system according to FIG. 1.

With reference to FIG. 2, a first operating mode is shown in which all the batteries B1, B2, B3 are connected to the recharging module 60. For this purpose:
  the first switch $I_{71}$ connects the first terminal $B_{61}$ of the charging module 60 to the first battery B1 (via the first point A),
  the second switch $I_{72}$ connects the second terminal $B_{62}$ of the charging module 60 to the last battery B3 (via the third point C).

Therefore, in this case, the voltage amplitude supported by the recharging module 60 is sufficient to recharge all the batteries B1, B2, B3.

Figure 3:
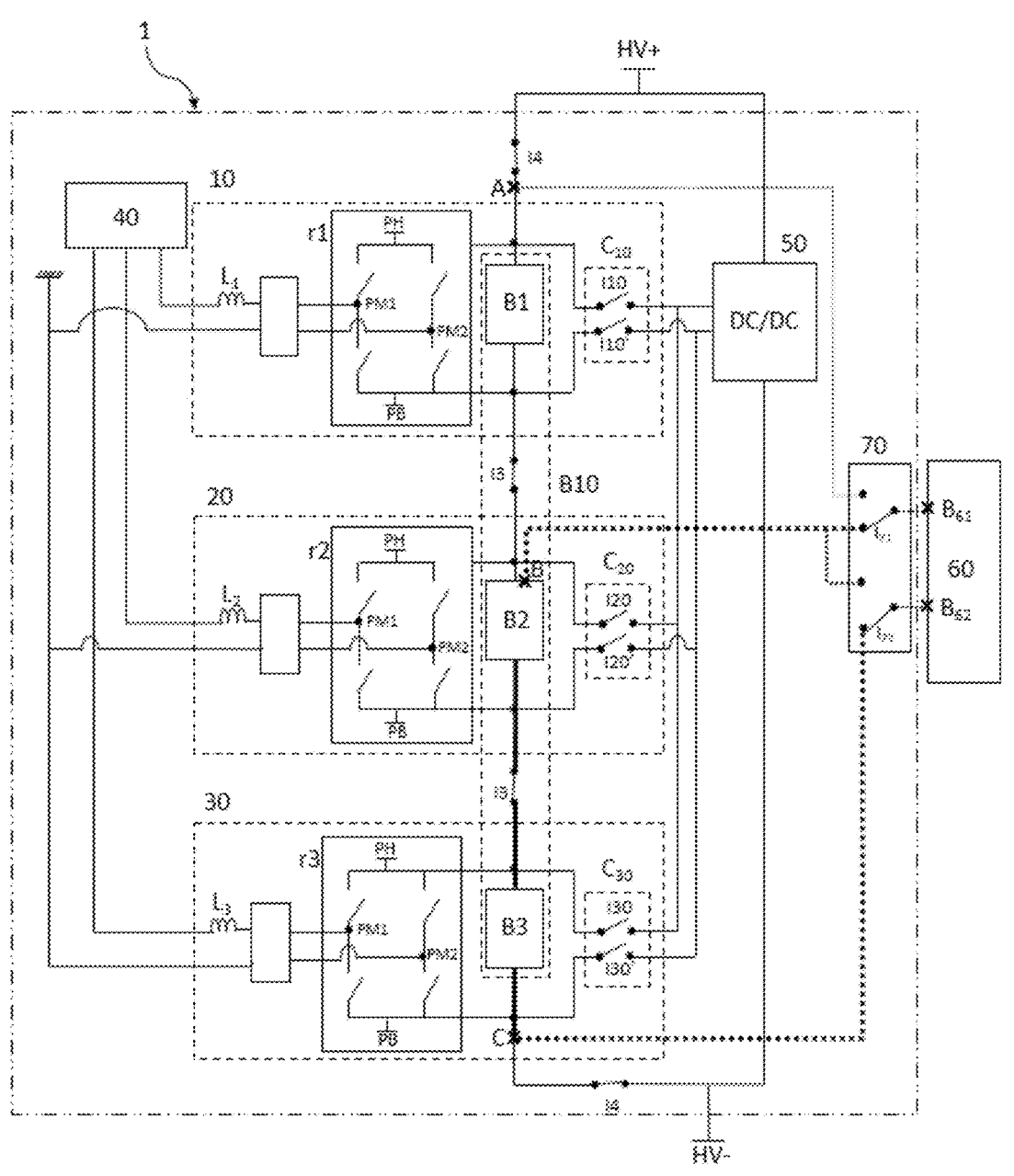
FIG. 3 is a circuit diagram showing a second operating mode of the power supply system according to FIG. 1.
Figure 4:
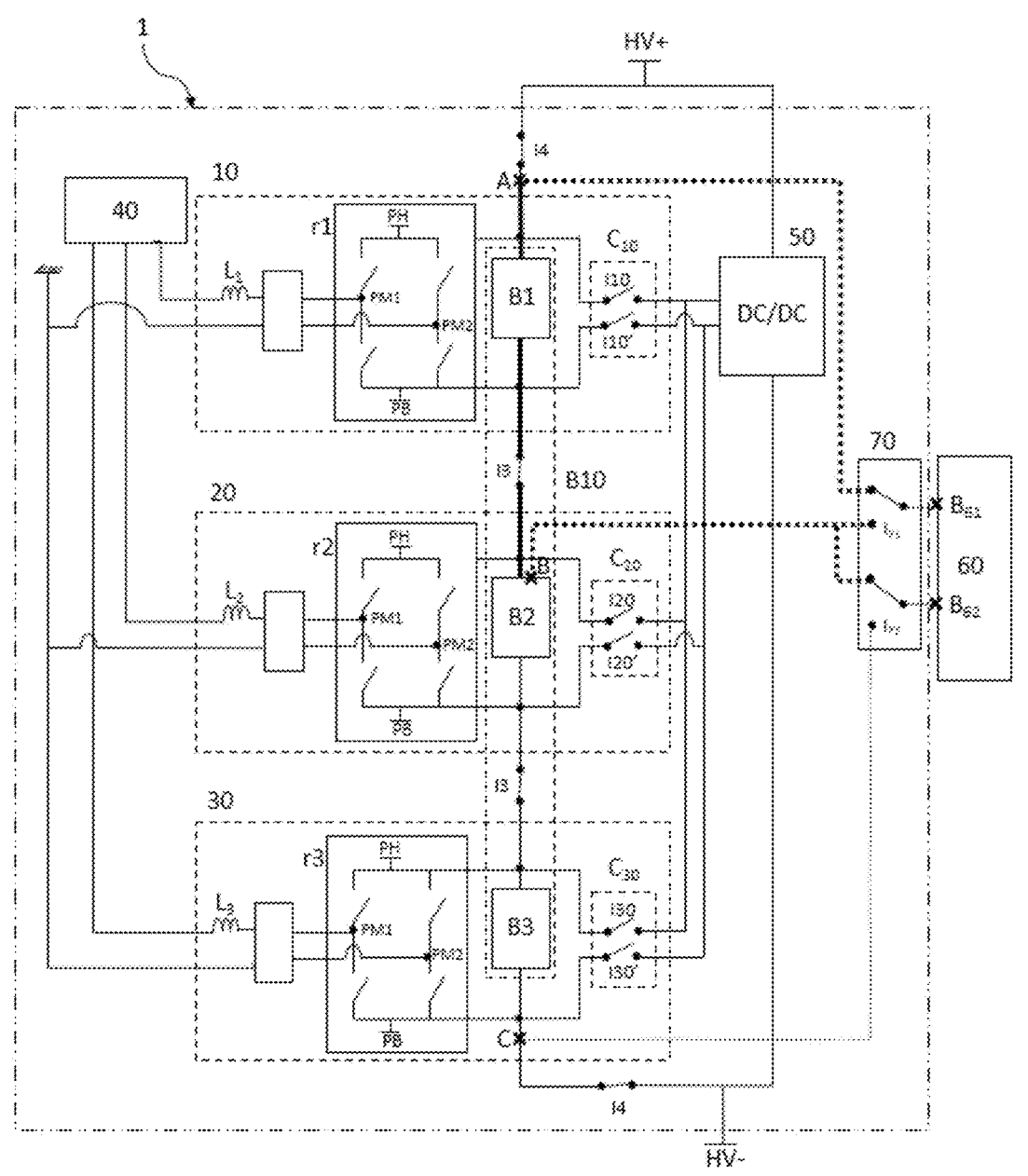
FIG. 4 is a circuit diagram showing a third operating mode of the power supply system according to FIG. 1.

With reference to FIGS. 3 and 4, two embodiments of a second operating mode of the distribution module 70 are shown, in which only some of the batteries B1, B2, B3 are connected to the recharging module 60.

According to FIG. 3, the first switch $I_{71}$ connects the first terminal $B_{61}$ of the recharging module 60 to one of the intermediate batteries, in other words in this case to the second battery B2. In addition, the second switch $I_{72}$ connects the second terminal $B_{62}$ of the recharging module 60 to the last battery B3.

According to FIG. 4, the first switch $I_{71}$ connects the first terminal $B_{61}$ of the recharging module 60 to the first battery B1 via the first point A. The second switch $I_{72}$ connects the second terminal $B_{62}$ of the recharging module 60 to an intermediate battery via the second point B, in other words, according to the example presented, to the second battery B2.

In the present case, when the portion of the supply voltage supported by the external recharging module 60 and available to recharge the set of batteries B1, B2, B3 is sufficient only to charge some of the batteries connected in series, only some of these batteries B1, B2, B3 are connected to the external recharging module 60 by the distribution module 70.

In addition, in the operating modes shown in FIGS. 3 and 4, the power supply cell(s) 10, 20, 30 for which the battery B1, B2, B3 is not connected to the recharging module 60 may be electrically connected to the power supply bus via the DC-DC converter 50, in particular to supply electrical energy to the power supply bus.

The invention claimed is:

1. An electric power supply system intended to be installed in an electric or hybrid vehicle, the vehicle comprising an electric power supply bus able to supply power to electrical equipment installed in the vehicle, said system comprising:
   a) a DC-DC voltage converter,
   b) at least two power supply cells, each comprising:
      i) a rectifier able to provide an AC voltage from a DC voltage and vice versa,
      ii) a battery, which is electrically connected to the rectifier, able to operate in a discharge mode in which the battery is able to provide a first DC voltage and able to operate in a charge mode in which the battery is able to recharge from a DC voltage,
      iii) a switching cell comprising switches able to connect the battery to the converter,
   c) a first set of switches able to connect the battery of a power supply cell to the battery of the neighboring power supply cell in order to connect the set of batteries in series,
   d) a second set of switches able to connect the set of batteries connected in series to the electric power supply bus,
   e) a control unit configured to control the first set of switches, the second set of switches and each switch of each switching cell,
   f) a distribution module intended to be connected to a recharging module external to the vehicle, said recharging module being configured to provide a supply voltage, the distribution module being configured to electrically connect at least one battery to the external recharging module in order to recharge the at least one battery from the voltage provided by the recharging module,
   g) a connection module configured to connect a single-phase voltage or a three-phase voltage to each power supply cell, the power supply system is configured to operate in an operating mode in which:
      the batteries are connected in series by the first set of switches,
      the distribution module connects one or more batteries to the external recharging module.

2. The power supply system as claimed in claim 1, in which the distribution module is configured to:
   a) in a first operating mode: connect the set of batteries connected in series to the external recharging module,
   b) in a second operating mode: connect half of the set of batteries to the external recharging module.

3. The power supply system as claimed in claim 2, in which the distribution module comprises:
   a first switch able to connect a first terminal of the external recharging module to the first battery of the set of batteries connected in series or to a battery located between the first battery and the last battery of the set of batteries connected in series,
   a second switch able to connect a second terminal of the external recharging module to a battery located between the first battery and the last battery of the set of batteries connected in series or to the last battery.

4. The power supply system as claimed in claim 1, in which each power supply cell comprises a coil, connected to the rectifier, on the one hand, and intended to be connected to an AC voltage, on the other hand.

5. The power supply system as claimed in claim 1, comprising three power supply cells.

6. A motor vehicle comprising an electric power supply bus able to supply power to electrical equipment installed in the vehicle, and an electric power supply system as claimed in claim 1.

7. A method for controlling a system as claimed in claim 1, said method being implemented by the control unit and comprising:
   a) connecting the set of batteries in series, and
   b) connecting the set of batteries, or some of the batteries, connected in series to the external recharging module.

* * * * *